(12) United States Patent
Salvi

(10) Patent No.: US 6,632,467 B1
(45) Date of Patent: Oct. 14, 2003

(54) SOLID CONDIMENT COMPRISING A SOLID AND A LIQUID

(76) Inventor: Mafalda Salvi, 2330 Linwood Ave., Fort Lee, NJ (US) 07024

( * ) Notice: Subject to any disclaimer, the term of this patent is extended or adjusted under 35 U.S.C. 154(b) by 0 days.

(21) Appl. No.: 09/956,931

(22) Filed: Sep. 19, 2001

(51) Int. Cl.[7] ............................ A61K 9/00; A61K 47/00
(52) U.S. Cl. ..................... 426/531; 424/400; 424/439
(58) Field of Search ................... 426/650, 564, 426/532, 268, 605, 96, 103, 104, 262; 424/439, 400

(56) References Cited

U.S. PATENT DOCUMENTS

| | | | | |
|---|---|---|---|---|
| 3,615,597 A | * | 10/1971 | Durst et al. | 99/140 R |
| 3,879,561 A | * | 4/1975 | Smith et al. | 426/533 |
| 4,220,667 A | * | 9/1980 | Jakinovich, Jr. | 426/96 |
| 4,525,372 A | * | 6/1985 | Giddey et al. | 426/564 |
| 4,547,377 A | * | 10/1985 | Ogawa et al. | 426/268 |

OTHER PUBLICATIONS

Label on Domino Pure Granulated Sugar container.*

* cited by examiner

*Primary Examiner*—Thurman K. Page
*Assistant Examiner*—Micah-Paul Young
(74) *Attorney, Agent, or Firm*—Pennie & Edmonds LLP

(57) ABSTRACT

This invention generally relates to solid condiments comprising a base solid and a dosing liquid and, in particular, is directed to solid condiments which are free flowing, dry to the touch, and provide desirable color, flavor and/or aroma accents to foods, as well as methods for the preparation of the subject condiment compositions. When the base solid comprises salt, the preferred salt base solid component of a condiment of the invention comprises sodium chloride, potassium chloride, MSG and mixtures thereof. When the base solid comprises sugar, the preferred sugar base solid components comprise at least one monosaccharide, disaccharide or nonnutritive sweetener. Preferred dosing liquids for the solid condiments include alcoholic beverages, coffee, tea, chocolate liquid, fruit liquid, berry liquid, vegetable liquid, spice liquid, herb liquid, and mixtures thereof

3 Claims, No Drawings

SOLID CONDIMENT COMPRISING A SOLID AND A LIQUID

FIELD OF THE INVENTION

This invention generally relates to solid condiments comprising a solid and at least one liquid component and, in particular, is directed to solid condiments which are free flowing, dry to the touch, and provide desirable color, flavor and/or aroma accents to foods, as well as methods for the preparation of the subject condiment compositions.

BACKGROUND OF THE INVENTION

Condiments have long been used to provide desirable color, flavor or aroma accents to foods. Both wine and salt, for example, are used in food preparation and consumed during meals. The same applies to wine and sugar. Although these products are widely used, they have not heretofore been combined into a single condiment product. The added benefits of this combination over the usefulness of each alone are many. For example, salt is almost always white. In a restaurant setting with dim lighting, it may be difficult to know how much salt is being added to one's meal. A colored form of salt provides a more readily visible way to determine how much salt has been added to food at the table, whether either a low or high quantity of salt is desired by the diner.

Diners often believe that wine ties the various courses or portions of a meal together and that salt makes food taste better. Normally these items are considered to perform two separate functions and, accordingly, are added separately. Never before have these two ingredients been combined into one solid condiment or flavor enhancer. Although it is a widely used spice, salt is not generally perceived to be particularly advantageous to health. On the other hand, a moderate amount of wine is believed by many to impart health benefits. A condiment comprising wine and salt allows the transfer of some of the perceived benefits of wine to salt.

Although it is beyond the scope of this invention to ascertain the health benefits of wine or the health disadvantages of salt, the public perception of salt would be most likely be improved by a condiment which combines wine with salt. While wine and, especially red wine, may comprise components that are believed to be beneficial, such as antioxidants, whatever these components may be, they have not heretofore been available to non-drinkers of alcoholic beverages. However, in a condiment of the invention comprising red wine and salt, with the exception or water and alcohol, substantially all of the remaining wine residues or components are present in such condiment and may be consumed by non-drinkers of alcoholic beverages.

It is widely accepted that decorative food preparations are essential for chefs to create competitive plate presentations. Currently used are herbs, such as chopped parsley, or vegetable or fruits. However, a rainbow of colored salts, for example, would provide a novel alternative to plate decorations while allowing the same flavor enhancement as provided by current decorative food components.

Although rock candy and rock sugar candy in different flavors are known, these products differ from the present condiments in, e.g., appearance, mouth feel, and in the way they are used. For instance, these solid, hard candy pieces are not usable as a dessert topping because their unchewability would be undesirable, for example, were they to be sprinkled atop a soft cheese cake. Alternatively, so-called "vanilla sugar" is known and available from, e.g., India Tree Gourmet Spices & Specialities/Gretchen Goehrend & Associates, Inc., Seattle, Wash. This material is made from turbinado raw cane sugar and ⅓ of a vanilla bean, i.e., a piece of vanilla bean approximately 2.25 inches long contained within the sugar, and has the same texture and overall appearance as raw cane sugar. It should be noted that this "vanilla sugar" lists no liquid ingredients. Alternatively, a Domino Pure Cane Granulated Sugar container discloses "vanilla sugar" and a method of preparing the same in which, inter alia, only 1 teaspoon of vanilla extract is blended with 2 cups of that sugar and the blend is dried for 4 hours at room temperature. Also known is unflavored colored granulated sugar, e.g., as is used for decorating Christmas cookies. All of these forms of sugar have a different texture and mouth feel than the flavored sugar condiments made by the method disclosed here and none have the flavor of, e.g., wine, beer, coffee, chocolate or GALLIANO liqueur, as the present sugar product may. Furthermore, by using a liquid flavoring composition, complex and innovative options become newly possible.

Additionally, the present solid condiment compositions comprising a sugar base solid allow for an increased range of creativity and decorative ability for, e.g., gourmet food preparers and for pastry chefs, where novel ingredients, appearances and mouth feels are critical to innovative presentations and preparations. For example, ice cream is now generally decorated with chocolate or multi-colored sprinkles. The present condiments allow for many new variations in this application. Additionally, various traditional dessert recipes do not allow for any liquid flavor addition; however, the condiments of the present invention allow for the flavor addition of liquids but by solid dosing e.g., forming fruit-flavored whipped creams.

Thus, the present base solids, such as salt or sugar, when used alone, are generally known. Similarly, the present dosing liquids, such as wine, coffee or GALLIANO liqueur, when used alone, are generally known. However, the solid condiment compositions of the invention described herein, which are free flowing, dry to the touch, provide desirable color, flavor and/or aroma accents to foods, and which combine the base solid with a dosing liquid, and the methods of forming the same, are novel and represent new products which provide unique and different utilities than each of their individual components.

SUMMARY OF THE INVENTION

One embodiment of the present invention relates to a solid condiment comprising at least one base solid, at least one dosing liquid and, optionally, at least one colorant, provided that when the base solid comprises sugar, the density of the solid condiment is from about 0.50 g/mL to about 0.70 g/mL and the solid condiment has a crunchy mouth feel. The base solid may be selected from salt, sugar, and mixtures thereof. The salt may comprise sodium chloride, potassium chloride, sodium glutamate, and mixtures thereof. The particle size of the solid condiment comprising salt may be from about 0.1 mm to about 1.0 mm and the density may be from about 0.80 g/mL to about 0.95 g/mL.

The sugar may comprise glucose, fructose, sucrose, lactose, maltose, and solid nonnutritive sweetening compositions comprising saccharine, cyclamate, glycyrrhizin, aspartame, and mixtures thereof and, preferably, may comprise sucrose, fructose, lactose, maltose, and mixtures thereof. The density of the solid condiment comprising sugar may be from about 0.60 g/mL to about 0.65 g/mL and the particle size may be from about 0.4 mm to about 2.0 mm.

Alternatively, the base solid may be selected from solid particulate cheeses, spices, corn meal which is optionally degerminated, powdered milk, powdered fruit drink, powdered tea, powdered coffee, ground cereals, bread, bread crumbs, flours, and mixtures thereof.

The dosing liquid may be selected from water, alcoholic beverages, coffee, tea, chocolate liquid, fruit liquid, berry liquid, vegetable liquid, spice liquid, herb liquid, and mixtures thereof and is preferably selected from the group consisting of water, wine, beer, hard liquor, liqueur, coffee, chocolate liquid, fruit liquid, berry liquid, spice liquid, herb liquid, and mixtures thereof.

Alternatively, the dosing liquid may be selected from water, wine, champagne, beer, liqueur, coffee, chocolate liquid, orange juice, lemon juice, cranberry juice, juniper berry liquid, strawberry liquid almond liquid, liquid vanilla, cinnamon liquid, saffron liquid, red pepper liquid, mint liquid, basil liquid, tea and mixtures thereof or the dosing liquid may comprise water or alcohol.

In another embodiment, the dosing liquid comprises an effective amount of at least one medication suitable for oral administration to mammals.

A further embodiment of the present invention relates to a method of forming a solid condiment comprising selecting a volume of at least one base solid, consisting of a first volume and a second volume; selecting at least one dosing liquid; adding the dosing liquid to the first volume of the base solid such that the first volume is substantially completely saturated and mixing to form a slurry; spreading the second volume of the base solid into a layer with a maximum depth no greater than about 0.25 inch; adding in at least one step the slurry to the layer and mixing to form a solid condiment such that substantially no dosing liquid flow is visible after the total volume of the base solid is present; and, optionally, drying the solid condiment; provided that when the base solid comprises sugar, the density of the solid condiment is from about 0.50 g/mL to about 0.70 g/mL and the solid condiment has a crunchy mouth feel.

When the base solid comprises sugar, the method may further comprise mixing the solid condiment during drying. When the base solid comprises sugar, the method may further comprise sieving the solid condiment during drying.

DETAILED DESCRIPTION OF THE INVENTION

This invention generally relates to solid condiments comprising a base solid and a dosing liquid. A solid condiment of the invention is formed from a substantially dry powder base solid that has been dosed with a dosing liquid and dried to form a free flowing granular product. Such condiments may be formed using different combinations of starting ingredients to exhibit a wide array of colors, aromas and flavors, each of which serve to enhance the food consumption experience or provide distinctiveness in the gourmet food area. Preferred base solids for the solid condiments include salt, sugar, and mixtures thereof.

As used herein, the term "salt" includes edible solids in which the majority component is crystalline sodium chloride. Thus, the term "salt" encompasses highest purity sodium chloride, table salt and sea salts of any type, variety, granulation or from a sea in any location, such as are obtained by solar evaporation of sea water or natural brines, as well as so-called "low sodium" or "light salts" which are well known to comprise mixtures of sodium chloride with non-sodium compounds such as potassium chloride or sodium silicate. As used herein, the term "salt" also includes edible solids in which the majority component is crystalline potassium chloride, so-called "no sodium" salts. Sodium glutamate or monosodium glutamate (hereafter "MSG"), i.e., the sodium salt of glutamic acid, serving in some cuisines as a salt substitute, is also included under the term "salt" as used herein.

The preferred salt base solid component of a condiment of the invention comprises sodium chloride, potassium chloride, MSG and mixtures thereof. More preferred salt base solid components include at least one member of the group consisting of sodium chloride and potassium chloride.

Useful salt base solid components can take a variety of physical forms, which can be used individually or in any combination as a base solid for the solid condiments of the invention. For example, useful sodium chlorides include coarse salt, such as is available from MORTON and DIAMOND KRYSTAL and which has a particle size of from about 0.4 mm to about 2.0 mm, table salt, which has a particle size of from about 0.1 mm to about 1.0 mm, and sea salt, which has a particle size of from about 0.5 mm to about 5 mm, each with a density of approximately from 0.6 to 1.1 5 g/mL. As long as it is a solid, the salt can be substantially pure, such as white table salt, incompletely refined such that some impurities remain after processing, or raw, such as sea salt.

Table 1 provides some exemplary solid condiments of the invention prepared from a salt base solid.

TABLE 1

Exemplary Salt Based Condiments

| Color | Dosing Liquid |
| --- | --- |
| Pink | Burgundy |
| Purple pink | Cabernet Sauvignon |
| White | White wine |
| White | Champagne |
| Beige | Beer |
| Green | Mint |
| Yellow | Saffron |
| Blue | Juniper berries |
| Red | Red pepper |

As used herein, the term "sugar" includes any edible carbohydrate product comprising one, two or more saccharose groups. As such, the term "sugar" includes the monosaccharide or simple sugars such as glucose, dextrose, fructose and levulose, the disaccharides such as sucrose, also known as table sugar, lactose and maltose, and the polysaccharides such as the water soluble gums of arabic and tragacanth. As certain sugars are optically active, such as fructose, the term "sugar" as used herein includes all of the optical isomers and mixtures of such isomers. As used herein, the term "sugar" also includes solid compositions comprising nonnutritive sweeteners, i.e., those materials having a similar or greater sweetness intensity to table sugar but with a substantially lower caloric value. Such a base solid for a solid condiment of the invention may be desirable because, for instance, many dieters deliberately limit their intake of table sugar while others do so for medical reasons, e.g., diabetics. Thus, a solid condiment formulated from a nonnutritive sweetener composition yields a no to low caloric content condiment which is still able to provide desirable color, flavor and/or aroma accents to food. Examples of nonnutritive sweeteners include saccharine, cyclamate, glycyrrhizin and aspartame, i.e., a blend of aspartic acid and L-phenylalanine. A nonnutritive sweetener is suitably blended with a carrier composition to form a solid nonnutritive sweetening composition. For example, it is well known that the solid nonnutritive sweetening composition SWEET'N LOW® comprises saccharine and a dextrose carrier and has a particle size of from about 0.1 mm to about 0.4 mm, while EQUAL® comprises aspartame and a dextrose carrier and has a particle size of from about 0.1 mm to about 0.4 mm. Other nonnutritive sweeteners which have yet to find widespread use in foods, such as dyhydrochalcones, dulcin (4-ethoxyphenylurea) (i.e., the glycoprotein of "miracle fruit"), and "serendipity berry" polypeptide, when each is combined with a suitable solid carrier, should also provide useful sugar base solid components for the present solid condiments.

Preferred sugar base solid components comprise at least one monosaccharide, disaccharide or nonnutritive sweetener. More preferred sugar base solid components include at least one member of the group consisting of glucose, fructose, sucrose, lactose, maltose, and solid nonnutritive sweetening compositions comprising saccharine, cyclamate, glycyrrhizin, aspartame, and mixtures thereof. Even more preferred sugar base solid components include sucrose, fructose, lactose, maltose, and mixtures thereof. Most preferably, the sugar base solid component of a condiment of the invention comprises sucrose and, more preferably, consists essentially of sucrose.

Useful sugar base solid components can take a variety of physical forms, which can be used individually or in any combination as a base solid for the solid condiments of the invention. For example, useful sucrose table sugars include granulated table sugar, which has a particle size of from about 0.1 mm to about 1.2 mm and a density of from about 0.8 to about 0.95 g/mL, and fine or powdered sugar, which has a particle size of from about 0.1 mm to about 0.8 mm with lower density. As long as it is a solid, the sugar can be substantially pure, such as white table sugar and white powdered sugar, incompletely refined such that some impurities remain after processing, such as brown table sugar, or raw, such as cane sugar. Other useful forms of sugar include turbinado, preflavored or precolored sugars, such as are commercially available, and novelty sugars like those from India.

An advantage of a table sugar-based solid condiment is that such condiments can be made to exhibit a wide range of desirable granular characteristics and mouth feels by a specific method of preparation, described below, which results in a distinctive "crystal" appearance and chewability, specifically, crunch, which is not delivered by table sugar or rock candy.

Table 2 provides some exemplary solid condiments of the invention prepared from a sugar base solid.

TABLE 2

Exemplary Sugar Based Condiments

| Color | Dosing Liquid |
|---|---|
| Pink | Burgundy wine |
| Purple pink | Cabernet |
| White | White wine |
| White | Champagne |
| Beige | Beer |
| Very pale yellow | Lemon |
| Brown | Coffee |
| Tan | Tea |
| Dark brown | Chocolate |
| Pale yellow | Orange juice |
| Yellow | Orange Juice and Galliano |

TABLE 2-continued

Exemplary Sugar Based Condiments

| Color | Dosing Liquid |
|---|---|
| Aqua | Mint and mint liquor |
| Bright green | Mint and Midori |
| Blue | Mint and blue Curacao |
| White | Almond and Amaretto |
| Beige | Vanilla |
| Yellow | Galliano |
| Green | Midori and melon |
| Pink | Cranberry |
| Orange | Cinnamon |
| White | None |

Other base solid components useful in solid condiments of the invention include any edible solid particulate food product which withstands dosing with a dosing liquid. Optionally, an edible solid particulate food product which is otherwise not suitable may be made to withstand such dosing by well known methods, e.g., by applying a dosing liquid resistant coating, such as a water resistant coating, to the surface of such product. Exemplary base solid components which are useful in solid condiments of the invention include but are not limited to solid particulate cheeses, such as Parmesan cheese, spices, such as ground white or black pepper, and other particulate solid food products, such as corn meal, which is optionally degerminated, or any other commercially available dry powder food or food product such as powdered milk, powdered fruit drink, powdered tea and coffee products, ground cereals, bread or bread crumbs, and flours. Preferably, such base solid components have a particle size of from about 0.1 mm to about 0.5 mm.

The dosing liquid typically imparts a distinctive or accenting color, flavor and/or aroma to the base solid. Thus, there are many possible dosing liquids. As used herein, the term "dosing liquid" includes any edible substance, or mixtures thereof, which takes the physical form of a liquid, i.e., is able to flow, at 25° C. temperature and 760 mm Hg pressure. Such liquids may be of relatively low viscosity, such as wine, beer or coffee, or relatively viscous, such as fruit pressings, edible oils or syrups. Additionally, the term "dosing liquid" as used herein includes solutions and flowable liquid-like substances which may contain a plurality of phases, such as mixtures, suspensions, emulsions, microemulsions, dispersions, pastes and slurries.

Dosing liquids may comprise the alcoholic beverages, such as wine, beer, hard liquor, liqueurs, and flavor concentrates. For instance, any wine, e.g., colored wines such as Burgundy, white or substantially transparent wines such as Chardonnay, rose-type wines such as pink Zinfandel, fortified wines such as port, sherry and sake, sparkling wines, such as champagne, and even non-alcoholic or substantially alcohol free wines, wine vinegars, or other wine flavored liquid such as wine cooler, may be included in the dosing liquid. Any beer, e.g., the lagers such as pilsner, and the ales, such as bock, Octoberfest style beer, barley wine beer, California steam beer, ice beer, stout, porter, the so-called light beers or reduced alcohol beers, malt liquor, malt-based wine cooler, and even non-alcoholic or substantially alcohol free beers, may be included in the dosing liquid. Liqueurs of all types may be included in the dosing liquid; these include GALLIANO, ANISETTE, KAHLUA, AMARETTO, SAMBUCA, MIDORI, COINTREAU, brandy, fruit brandies, sake, Creme de Menthe, Creme de Cassis, Curacao, SOUTHERN COMFORT, VANDERMINT, CHAMBORD, BENEDECTINE, BAILEY'S IRISH CREAM, and flavor concentrates of these. Any type of hard liquor may be included in the dosing liquid including whisky, scotch, bourbon, gin, rum, tequila and vodka.

Coffee of any kind, brand or manufacturer may be included in the dosing liquid. As used herein, the term "coffee" includes any liquid prepared from coffee seeds from plants of the genus Coffea, or the synthetic counterpart thereto. For example, liquid coffee formed by brewing, dripping, percolating or dissolving instant coffee in water may be used. Espresso, cappuccino and late coffees may be used. The coffee may comprise caffeine or be substantially caffeine free and may optionally comprise another flavor or flavors such as chocolate, cinnamon or mint. Similarly, tea of any kind, brand or manufacturer may also be included in the dosing liquid. For example, liquid tea formed by brewing or steeping at least a portion of a leaf of Camellia sinensis or any of the so-called herbal teas in water, or by dissolving instant tea in water may be used. The tea may comprise caffeine or be substantially caffeine free and may optionally comprise another flavor or flavors such as lemon or raspberry. Concentrates or flavorings of any coffee or tea, whether natural or artificial, may also be included.

The dosing liquid may comprise chocolate. As used herein, the term "chocolate" includes any substance prepared from cacao seeds, or the synthetic counterpart thereto. Exemplary chocolate liquids include liquid cocoa, which comprises cocoa powder and water, and chocolate syrup. For example, chocolate may be liquefied by adding a small amount of water to cocoa powder, thereby wetting it, until a liquid paste is formed.

The dosing liquid may comprise a juice, nectar or concentrate derived from fruits such as oranges or apricots, berries such as cranberries or strawberries, or vegetables such as tomatoes, carrots or celery. Alternatively, the dosing liquid may comprise other liquid derivative(s) of such fruits, berries or vegetables, e.g., extracts, pressings, or oils, obtained by well known methods such as brewing, steeping, extracting, dripping, percolating, cutting, grinding, pulverizing or dissolving, as well as commercially available juices such as orange juice, e.g., liquid or frozen concentrate, lemonade, e.g., liquid, powder or concentrate, and other preparations of this type. Thus, as used herein, the terms "fruit liquid", "berry liquid" and "vegetable liquid" include any substance taking the form of a liquid which is derived from a fruit, berry or vegetable source, respectively.

The dosing liquid may comprise a liquid or liquified form of any kind of spice or herb, such as cinnamon, pepper, vanilla, vanilla extract, saffron or mint, provided that such spice or herb is different from the base solid(s) used in the solid condiment. Alternatively, the dosing liquid may comprise other liquid derivative(s) of such spices or herbs, e.g., extracts, pressings, or oils, for example, juniper berry extract or spearmint spirits, obtained by well known methods such as brewing, steeping, extracting, dripping, percolating, cutting, grinding, pulverizing or dissolving. Thus, as used herein, the terms "spice liquid" and "herb liquid" include any substance taking the form of a liquid which is derived from a spice or herb source, respectively. These may be prepared directly from the original component or obtained from flavoring preparations available to the food trade.

Preferably, the dosing liquid also comprises water or alcohol, e.g., ethanol. Such dosing liquids are preferred, for example, because water or alcohol are readily evaporated during the process of preparing a solid condiment and their vapors pose minimal hazards.

The dosing liquid may be used as obtained or diluted or even concentrated before dosing as required to obtain the desired color, flavor and/or aroma accent in the solid condiment. For example, the flavor of spearmint spirits is concentrated and considered to be intense, therefore, its dilution prior to dosing may be desirable.

Preferred dosing liquids for the solid condiments include water, alcoholic beverages, coffee, tea, chocolate liquid, fruit liquid, berry liquid, vegetable liquid, spice liquid, herb liquid, and mixtures thereof. More preferable dosing liquids include water, wine, beer, hard liquor, liqueur, coffee, chocolate liquid, fruit liquid, berry liquid, spice liquid, herb liquid, and mixtures thereof. Most preferably, the dosing liquids for the solid condiments include water, wine, champagne, beer, liqueur, coffee, chocolate liquid, orange juice, lemon juice, cranberry juice, juniper berry liquid, strawberry liquid almond liquid, liquid vanilla, cinnamon liquid, saffron liquid, red pepper liquid, mint liquid, basil liquid, tea and mixtures thereof.

A suitable solid condiment of the invention can be formed, after any optional dilution or concentration is performed on the dosing liquid, by using an initial ingredient concentration of about 85% to about 93% by volume of the base solid and about 7% to about 15% by volume dosing liquid. Of course, one of ordinary skill in the art, guided by the appropriate method or methods described below for combining the desired solid base and dosing liquid, will be able to appropriately adjust the suggested initial ingredient concentration, if required, with a minimal degree of experimentation.

Optionally, colorants and/or dyes are used as desired or needed to achieve specific color effects. Such colorants and dyes may be synthetic or of natural origin, are well known to those in the art and, preferably, are edible. More preferably, these colorants and dyes are those approved for human consumption pursuant to the Food, Drug and Cosmetic act. As used herein, the term "colorant" includes colorants and dyes.

Optionally, other well known food ingredients such as spices, antioxidants, preservatives, viscosity modifiers such as thickeners, nutritional supplements such as vitamins and/or minerals, and the like may be added either individually or in any desired combination to the solid condiments of the invention. Anti-caking additives may also be added, in addition to any such additives which may already be present in the base solid. All of these materials, which are well known in the art, are added for their usual purpose in typical amounts. These food ingredients may be added to the solid condiment while it is being formed. For example, liquid food ingredients may be mixed with the dosing liquid before dosing while solid ingredients may be mixed with the base solid before or after it is dosed. Alternatively, any food ingredient(s) which are heat sensitive may be added to the solid condiment after the drying step by any suitable method, many of which are well known to those in the art.

The dosing liquid need not contain any colorant or flavor and may be, for example, substantially pure water which is used, e.g., for the purpose of changing particle size and increasing granulation of table sugar to yield a different visual effect, to allow for chewability, or to change the mouth feel of table sugar while retaining the initial flavor of the starting component.

In an alternate embodiment of the invention, at least one medication suitable for oral administration, such as a prescription medication, an over-the-counter medication or a herbal product, may be added either individually or in any desired combination to the solid condiment. A solid base comprising sugar may be particularly beneficial in such condiments if they are administered to children or mammalian pets, such as cats and dogs. However, any solid base and dosing liquid used should be carefully chosen such that they do not react detrimentally with the medication(s), instantaneously or over time, or detrimentally alter its desired therapeutic effect. Such determinations do not require undue experimentation and are well within the capabilities of those in the art. A solid condiment comprising medication(s) is useful in that it expands the modes of delivery possible for such medication and may be particularly suitable for administering medication to, e.g., infants, children or animals.

For example, a solid condiment comprising a medication was prepared by dosing sugar with PEPTO BISMOL®, resulting in a pink, dry product that could be eaten as a food product or on food. Although liquid PEPTO BISMOL can be poured onto foods such as ice cream, the solid condiment prepared here would likely be more preferred, especially by children. Another condiment product was similarly prepared using cough syrup, ROBITUSSIN D.M.®, as the dosing liquid. As many syrups of this type already contain sugar, flavorings and colorants, dosing the medicine in these products onto a sugar base solid is a heretofore unknown application, but one which is advantageous. For example, increased stability and/or cost reduction is possible because of the dry form of delivery, e.g., such as reduced costs for packaging or shipping, as opposed to a less stable liquid form, which maybe susceptible to heat or freezing.

In another embodiment, the amount of solid condiment comprising medication(s) required to deliver the desired medication dose can be prepackaged into a portion controlled pouch, the contents of which are substantially entirely consumed alone or with a meal.

The solid condiment composition suitably has a particle size of from about 0.4 mm to about 6.5 mm. When the solid condiment composition comprises salt, the particle size of the solid condiment is substantially the same as the particle size of the original base solid which, for example, can be a salt of the various sizes described previously. Preferably, when the solid condiment composition comprises salt, the particle size is from about 0.1 mm to about 5.0 mm and the density is from about 0.60 to about 1.15 g/mL and, more preferably, the particle size is from about 0.1 mm to about 1.0 mm and the density is from about 0.80 to about 0.95 g/mL. Preferably, when the solid condiment composition comprises sugar, the particle size is from about 0.4 mm to about 6.5 mm and the density is from about 0.50 to about 0.70 g/mL and, more preferably, the particle size is from about 0.4 mm to about 2.0 mm and the density is from about 0.50 to about 0.65 g/mL and, most preferably, from about 0.60 to about 0.65 g/mL.

Furthermore, the methods of the invention allow for the formation of pleasant chewing sugar-based compositions. Table sugar is rarely eaten for its own sake in its powder form and is, perhaps, only consumed, as a solid, in the form of sugar cubes. The likely reason for this is the unpleasant sensation, under the teeth, of particles grinding, which may yield an unpleasant reaction upon chewing similar to when listening to chalk grind on a blackboard. Thus, the chewing of table sugar, although possible, is unpleasant and not often done due to the gritty, grinding sensation between the molar teeth upon chewing. That is, normal sugar acts more as an abrasive, like sand, upon chewing and yields the same unpleasant mouth feel or sensation as chewing sand.

In contrast, the sugar-based solid condiments of the invention allow for more yielding and more chewable flavored sugar products, or of sugar itself by changing the texture of sugar, in these condiments to mimic the crunchy and more pleasant mouth feel of products, such as cereals or nuts, instead of the gritty, unpleasant sensation of sand or abrasive materials of too fine a texture, such as table sugar. The mouth feel of a solid condiment of the invention formed from a base solid comprising sugar is such that it should be hard but sufficiently pliable as to be able to be chewed immediately and provide a "crunch" under the teeth, which is desirable. The amount of crunch should be much less than that of hard candy but much more than that of granulated table sugar. Preferably, the particle size of the solid condiment formed from a sugar base solid should be increased above that of the original sugar base solid. If larger aggregates are desired for their visual effect in some applications, this can be achieved, however, the solid condiment then becomes more difficult to crunch because it comprises larger pieces. Even with larger aggregates, however, such solid condiments do not resemble rock candy in any way, either in appearance or mouth feel, and therefore are used for very different applications.

This mouth feel change is postulated to be due to the change in density of the sugar product, from an initial density of from about 0.88 to about 0.95 g/mL (e.g., close to the density of water) with minimal air-space between particles, to a finished product with a density of approximately from about 0.5 to about 0.65 g/mL, depending on the desired particle size. For example, a reduction in density of from about 20% to about 55% has been achieved for various sugar-based condiments. It is believed that the method of the invention has thus introduced air between sugar particles, forming aggregates which yield and collapse upon slight pressure applied with the teeth, thereby providing a more pleasant mouth feel for the present sugar-based solid condiment compositions. After this structure collapses, the solid condiment is, like table sugar, melted by the saliva in the mouth before it is digested.

This invention also generally relates to methods for the preparation of the above-described solid condiment compositions. Because there are many possible combinations of, e.g., type and particle size of the base(s), type and concentration of the dosing liquid(s), optional additive(s), and the coloration, aroma, flavor desired in the final solid condiment, the following methods provide guidance for preparing the same wherein a minimal degree of experimentation is necessary for successfully adjusting to the exact combination and characteristics of ingredients desired for a particular solid condiment.

Base solids of different types vary in both dosing liquid absorption rate and absorption capacity, e.g., because of variations in their average particle size, which may range from coarse to fine. The following three methods of preparation have been found to deal effectively with these variations and do not require lengthy experimentation prior to successful preparation of a solid condiment of the invention.

The first method allows for slow handling and good control over the amount of dosing liquid being used, is particularly useful for base solids, e.g., salt or sugar, of smaller particle size, which have a correspondingly greater surface area, or for base solids which take up less dosing liquid, and, in particular, allows for the desired degree of granulation or particle size and mouth feel to be established at the start of the method for a base solid comprising sugar. Given that a sugar base solid can coagulate to form solid larger particles, the first method allows for the creation of sugar "granules" of distinctive particle size and mouth feel, rather than just coloring or flavoring the original sugar.

First, the total amount of base solid to be dosed with dosing liquid is determined. About 1 part dosing liquid to 6 parts of a salt base solid by volume has been found to give good results, therefore, this ratio may serve as a guide to begin the preparation. For a sugar base solid, about 1 part dosing liquid to 13 parts of the sugar base solid by volume has been found to give good results. The total quantity of base solid is divided into portions, preferably thirds, and to the first third is then added sufficient dosing liquid to substantially completely saturate the base solid and form a wet intermediate product or slurry. To form the intermediate slurry, the solid is placed into an appropriate container, e.g., spread onto a tray, and the liquid added, then mixed. The method of mixing can be by power mixing equipment or by hand using the desired hand held implement.

Then, the remaining two thirds of base solid is spread out as a layer on a flat tray, e.g., a baking sheet or baking pan, to an approximate maximum depth of about 0.25 inch, and is preferably substantially evenly spread, as substantially greater layer depths may interfere with proper liquid evaporation. The slurry is added to the base solid layer and mixed. A sufficient amount of slurry is added to the dry material to cause granulation. The method of mixing can be by power mixing equipment or by hand using the desired hand held implement. The mixing is continued until all of the intermediate product is wet and uniform such that there is substantially no visible flowing dosing liquid remaining. Care should be taken when adding the slurry as it is easier to add more slurry in a subsequent step than it is to "reabsorb" an excess of liquid from the slurry by adding more dry material. However, if any liquid or liquid flow is visible after the total amount of the base solid is present, an additional small quantity of base solid can be added to absorb this liquid.

When the slurry is being added to a salt base solid, no particular mechanical action is needed other than mixing of the components to achieve a uniform appearance. There will be no substantial aggregation of the salt base and no substantial increase in the granulation of the product. If large scale mechanical mixing equipment is used, care should be taken so as not to significantly change the initial particle size by mechanically altering the salts particle structure.

When the slurry is being added to a sugar base solid, the slurry is "cut" into the sugar base solid a bit at a time, much in the same way that butter is "cut" into flour in making pie dough. This tends to create the desirable larger granulation. Machinery known to the art can be used to accomplish the "cutting in". However, when done manually, e.g., to prepare a small sample quantity (3–5 lbs), using a fork, spoon or pastry cutter is preferred for mixing as this provides simplicity and good control of the finished product.

The saturated intermediate product should be in the form of a solid. It is then spread out as a layer on a flat tray, e.g., a baking sheet or baking pan, to an approximate maximum depth of about 0.25 inch, and preferably substantially evenly spread, to promote proper evaporation of liquid during the following drying step. A substantially greater depth, e.g., 0.5 inch, may result in product which is layered too deeply and is likely to lengthen and make more difficult a subsequent drying step. As heat exposure conditions of the tray used to evaporate the liquid are not excessive, the type of tray material is usually not important, as long as it is appropriate for manufacturing food products and for use in an oven to at least 160° F. Aluminum or stainless steel trays are preferably used for a base solid comprising salt.

The composition should be capable of moving freely on the tray's surface (i.e., not stuck to that surface), and no part of it should have an overly wet appearance before it is placed in a drying oven. If the composition comprises a sugar base solid, it should have visibly larger granulation over the starting base solid.

The composition is then dried. For example, the tray may be placed in a thermally heated oven at a temperature range of from 135° F. to about 1 60° F. Temperatures lower than about 130° F. may result in excessively long drying times, unnecessarily adding to the exposure time of any components that may be sensitive to heat, yield a less stable product in terms of color and odor, and invite the possibility of bacterial exposure or growth in a moist warm environment. Thermal drying at a temperature above 160° F. is not preferred because this may result in product burning, caramelizing of a base solid comprising sugar, or, for the case of a temperature-sensitive dosing liquid, such as one comprising red wine, the color bodies of the wine may begin to fade, which may indicate the decomposition or change in the wine residue components, and the composition may even become malodorous with an undesirable appearance of being burned at the edges. The oven temperature or setting may be increased depending upon the oven's size, but the product temperature should preferably remain within the range indicated above. During the drying process, moisture and any alcohol present are substantially evaporated to the point of yielding a free flowing, substantially dry product at the conclusion of drying.

The amount of drying time may vary depending on the degree of liquid not absorbed during preparation of the intermediate product, the specific type of base solid used, the oven or heat type (gas or electric), and distance between the salt or sugar and the heat source. As discussed above, the method may be very sensitive to the maximum temperature used but is not necessarily overly sensitive to the type of heat; both gas and electric heat sources have been used successfully. Good results have been obtained with a electric sources with elements about 4 inches above and below the tray, as in a toaster oven. Preferably, the total drying time should be approximately 1 hour or less. Drying can also be accomplished by using a convection oven at a temperature of about 160° F. for about 15–20 minutes or a with a microwave oven. However, when using a microwave oven, drying may be less controllable because it is inconvenient to stir the product and it is more difficult to monitor the progress of the drying and control its temperature.

To expedite drying when the solid base comprises salt, the mixture can be agitated or stirred as needed to increase the dosing liquid evaporation rate. To control granulation or to obtain the desirable granulation and mouth feel when the base solid comprises sugar, the composition should be mixed during the drying process. Very large sugar "granules" or aggregates may tend to form as the dosing liquid evaporates, therefore, these crystals are broken up manually, taking care not to break up forming "granules" or aggregates of the size desired in the finished product. This is easily done during drying with an implement, such as a fork, spoon or pastry cutter, rather than following drying, when the sugar has hardened into a "permanent crystalline" form. In addition, if a more uniformly granulated product is desired, the condiment comprising a sugar base solid can be passed through a sieve of the desired size about half way through the drying process, when enough liquid has been removed to allow it to be handled but not so much liquid has been removed as to render the large "granules" virtually unbreakable, other than by the use of extreme force. By utilizing this intermediate sieving step, the finished solid condiment will achieve the desired particle size upon completion of drying with relative ease. Drying should be executed substantially to completion to retain the desired and achieved particle size.

Alternatively, the condiment product does not necessarily need to be dried, e.g., if a particular application allows it to be used wet, if the solvent is needed as part of product, or if a dry free flowing product is not necessary.

If the mixing is not done correctly either before or during drying or if too much dosing liquid was added, for example, the sugar base solid may start to form a crust and develop a syrupy appearance once exposed to heat in the drying oven. The resulting crusty, syrupy or caramelized product cannot be salvaged by the addition of additional base solid because, under such conditions, the product does not revert to a solid, granular state. Thus, it is preferable to operate with somewhat less than the maximum possible amount of dosing liquid when a sugar base solid is used because the process can be repeated with the addition of a further portion of dosing liquid, if desired.

However, it is evident that, if too much dosing liquid is added at the outset, the excess liquid cannot be readily removed and may lead to unsuccessful results.

The completion of drying is marked by substantially complete evaporation of all of the liquid to yield a free flowing, solid condiment product which is dry to the touch. Following this, the product is cooled to room temperature. The volume of solid condiment obtained will be approximately equal to the volume of the base solid before it is combined with the dosing liquid.

For a sugar base solid, the finished product will preferably have a larger granular appearance, an average particle size greater than that of the original sugar base solid, and the previously described mouth feel. Preparation of a product comprising a sugar base solid may require more attention, but the method is equally reliable as the method used for forming a solid condiment from a salt base solid. If the finished product does not exhibit the desired particle size perhaps due to, e.g., an error in measuring the components, the finished sugar product can be wet again with an additional portion of the dosing liquid and the procedure repeated to dryness to achieve the desired condiment product.

The following method has been found to be effective for preparing a sugar base solid condiment by the first method. In a dish, 20 grams of the sugar was mixed with 4.0 mL of red wine forming a wet, thick slurry. A portion of this slurry was then "cut" into 30 g of the same sugar using a fork, as previously described, forming aggregates of a wet mixture. In this instance, there was no particular target particle size. The product was mixed well to create a uniform product, i.e., there was substantially no white sugar left not incorporated into the wet mixture and substantially no excess liquid was observed. The resulting mixture was placed in an aluminum pan and the pan was placed in a toaster over to dry at 160° F. After 15–20 minutes, the product was stirred, breaking up any large aggregates. The product was left to dry completely for another minutes until dry and free flowing. Its measured density was about 0.62 g/mL.

Alternatively, for more rapid condiment formation, the wet product mixture was placed on a dish in a microwave oven and dried at 30 second intervals, 3 times, until dry to the touch. However, for sugar based condiments, the use of a microwave oven may add complexity compared to salt-based condiments, e.g., because overheating caramelizes the sugar. Thus, sugar is more sensitive to heat and steam than the salt-based condiments.

The first method can also be used when it is desirable to concentrate the color or flavor of the dosing liquid in the finished solid condiment product, such as when a diluted dosing liquid is being used, for example, certain wines or beer. A portion of the solid condiment can be taken aside and treated with an additional portion of dosing liquid as described above. The treated portion is then added back to the remaining, already dried solid condiment product and any excess liquid is evaporated again under the above-described conditions. This procedure can be repeated several times until the desired color and flavor concentration is obtained. However, excessive use of this procedure may reduce the overall stability of the product due to excessive heat exposure. It has been found that the procedure can be successfully used up to three times. Repetition more than three times is possible but often time consuming and, therefore, may not be practical. To avoid excessive repetitions, a more concentrated dosing liquid can be used at the outset.

Preparation of salt-based condiment products is more amenable to variations in the liquid dose as more salt can be easily added to absorb any excess liquid without affecting the finished product, as the salt-based product does not usually undergo any substantial particle size change. Thus, the second and third methods, described separately below, are ideally suited for many base solids, such as salt, but are not as preferable for the preparation of a solid condiment comprising a sugar base solid. These methods may result in the use of too much dosing liquid and risk forming a syrup from the composition comprising a sugar base solid rather than the desired substantially dry solid condiment upon heating. While not wishing to be bound by any particular theory, a change in the liquid absorption ability of sugar when it is heated as compared to its original level at room temperature may give rise to such difficulties. Additionally, it is well known that sugar is heat and moisture sensitive, therefore, variations in the exact temperature and/or moisture levels of the ambient air may cause difficulties in preparing a solid condiment from a sugar base solid and a dosing liquid. Given that it could be difficult for a food preparer to determine exactly, in a practical manner and without the aid of scientific equipment, how much liquid is needed to achieve a satisfactory finished product with a sugar base solid, the first method above is preferred for the preparation of a solid condiment comprising a sugar base solid.

The second method is particularly useful when adding a non-sugar base solid to dosing liquid. The proportions of dosing liquid and non-sugar base solid, e.g., salt, which are to be combined may vary from the approximate amount recommended above depending upon, for example, the brand and granulation of the salt used. To achieve the proper proportion of dosing liquid and salt without extensive experimentation, the following procedure may be used.

First, a quantity of dosing liquid is poured into a flat tray, e.g., a baking sheet or baking pan, such that the depth of the dosing liquid does not exceed approximately 0.25 inch. A substantially greater dosing liquid depth, e.g., 0.5 inch, may result in product which is layered too deeply and is likely to lengthen and make more difficult a subsequent drying step, or begin "melting" the salt upon addition. Once the desired amount of dosing liquid has been added, the base solid is added to the tray until substantially all of the dosing liquid is absorbed onto its surface. The amount of salt base solid required can be estimated by allowing 6 parts salt to about 1 part dosing liquid by volume. For example, if 1 cup of dosing liquid was used, approximately 6 cups of substantially dry salt should be needed and this will yield approximately 2 cups of solid condiment product. The addition of salt to the dosing liquid should be relatively rapid, i.e., conducted in less than 30 minutes and, preferably, in less than 5 minutes, so that the salt does not dissolve in the dosing liquid and to minimize the opportunity for possible contamination from, e.g., exposure to microbes in the air. The use of a flat surface also minimizes "melting" as opposed to pouring the salt into a bowl type of receptacle for containing the liquid. Using a bowl would typically dissolve a significant portion of the salt and change the original particle size distribution. Optionally, the salt and dosing liquid may be mixed by any appropriate means, e.g., manually with a fork, spoon or spatula or mechanically with a mixer apparatus, to help saturate the salt with dosing liquid. Generally, absorption will not increase with an increased time of contact between dosing liquid and salt. This method is also useful when the amount of liquid available is limited and the liquid is, therefore, the limiting agent.

As a test for whether the proportions of dosing liquid and salt base solid are satisfactory, there should be no free running liquid visible if the tray is tilted. If there is free running liquid, then not all of the dosing liquid has been absorbed by the salt and more salt should be added. Excess dosing liquid is not preferred because this will result in a longer drying time for the product, a greater requirement for heat to evaporate the liquid, and more exposure of any heat-sensitive component, such as any wine which may be present to heat. Excess dosing liquid may also necessitate stirring to achieve a uniformly colored product because the drying process may not be uniform and result in a combination of lighter and darker shaded product particles. On the other hand, there may be instances where such variations in product coloring may be desirable, in which case the stirring may be omitted.

Alternatively, adding too much salt beyond what is satisfactory may dilute the color of the product and the intensity of its flavor and/or aroma. The point at which too much salt has been added will be evident when the added white salt remains on the colored surface because no more liquid is available to be absorbed onto the salt. Should this occur, the surface salt should be mixed into the remaining mixture. If there is excess salt present, it is a simple matter to restore a satisfactory ratio of dosing liquid to salt by adding a further portion of dosing liquid as described above.

Thereafter, drying takes place. A suitable drying procedure, such as is outlined in the first method, can be is followed. Generally, there is no need for mixing during drying as the average particle size of a condiment formed from a salt base solid does not tend to change substantially during the process.

The third method provides an alternate method of preparation if the exact amount of base solid is determined and known. Thus, the third method can be used with a sugar base solid once experience has been developed on the behavior of the particular sugar base solid/dosing liquid combination, such as by practicing the first method with that combination, so that the liquid addition can be controlled in the third method. In this method of combining a dosing liquid and a base solid, e.g., salt, is first poured onto an appropriate surface, e.g., a tray. Approximately 6 parts by volume of base solid are used per 1 part dosing liquid. The base solid should be layered thinly onto the tray, no more than about 0.25 inch in depth, as substantially greater depths may interfere with proper liquid evaporation.

The dosing liquid is then added to the base solid, slowly, allowing the base solid to absorb the dosing liquid. The dosing liquid should not be added to the point of allowing the base solid to dissolve in excess dosing liquid. If a coarse salt is being used, fast dosing liquid addition will result in an increased level of fines or finer product in the finished composition. Enough dosing liquid is added to just saturate the base solid, and not to the point of creating a runny slurry or saturated solution. Addition should be stopped when free flowing liquid is observed and liquid absorption has stopped. If there is any residual liquid, it can be eliminated by adding sufficient base solid to absorb the dosing liquid. The rest of this method proceeds as in the second method discussed above. The third method is most useful when the base solid is the limiting agent and when it is advantageous for more of the original particle size distribution to be maintained in the final solid condiment.

The following method has been found to be effective for preparing a salt base solid condiment by the third method. 50 grams of MORTON® coarse kosher salt was poured onto an aluminum dish and leveled as described above. 8 mL of red wine was poured slowly on top of the salt, thereby allowing for absorption, which occurred within seconds. The resulting mixture was stirred to assure uniformity. No excess liquid was observed at this volume/weight ratio. The product was dried in a toaster oven at 160° F. for 30 minutes until completely dry to the touch. Larger quantities (2 lb.) were also prepared using a commercial convection oven to dry the product. Drying occurred faster, within about 15 minutes at 160 F. Alternatively, for a quicker preparation, the mixture was poured onto a microwave-oven-safe dish and placed in a small microwave oven for 1 minute. The resulting product was dry and free flowing.

The following method has been found to be effective for preparing a sugar base solid condiment by the third method. 50 grams of extra fine DOMINO® sugar was placed in an aluminum pan and leveled as described above. 4 mL of red wine were poured onto the product. The coagulated wet portions were mixed into the remaining dry portions with a fork, cutting the wet portion into the dry, until a uniform mixture was obtained and no excess liquid was observed. In this instance, no particular particle size target was set, therefore, sieving was not used. The resulting mixture was placed in a toaster over to dry at 160° F. After about 15–20 minutes, the product was stirred, breaking up any large aggregates. The condiment product was left to dry completely for another 15 minutes until dry to the touch and free flowing. Its density was determined to be 0.52 g/mL. Larger quantities (2 lb.) were also prepared using a commercial convection oven to dry the product. Drying occurred faster, within about 15–20 minutes at 160° F. Alternatively, for a quicker preparation, the mixture was placed onto a microwave-oven-safe dish and dried for 30 second intervals in a microwave, 3 times, until dry to the touch.

Regardless of which of the above methods is used in preparing the solid condiment, when the product reaches room temperature after cooling, it is preferable to store the solid condiment in either a closed plastic container or glass jar placed in the dark in a refrigerator or, preferably, in a freezer if the liquid is wine of any kind, for either a sugar or salt-based condiment. Other solid condiments of the invention can be stored at room temperature. In the freezer, the product will typically keep its original color, aroma and flavor for at least 3 months. Brief periods at room temperature are generally not detrimental to maintaining a long storage life. The finished solid condiment composition, stored in either the refrigerator or freezer, maintains its overall fresh original properties including the dry and free flowing character, particle size and mouth feel. As a food additive or product, this shelf life is sufficient to render the product useful in a practical manner.

As a general rule, once the base solid and the dosing liquid have been combined, the resulting solid condiment has storage requirements more like those of the dosing liquid that the base solid. For example, although a solid condiment formed from wine and salt is used and handled as salt would be and consumed in the manner that salt would be, for the purposes of storage conditions this condiment should be treated as a wine product or an opened bottle of wine and stored as such. Thus, it is preferable that a solid condiment comprising a substance known to those in the art to be perishable, such as wine or wine components, not be exposed to light or stored at room temperature for long periods, otherwise, decomposition of the color bodies of wine components or reaction of these with the base solid may result. These storage requirements are akin to those of an opened bottle of wine. If that bottle were left open, light, moisture and heat could degrade the wine and change its overall composition, color, aroma and flavor. Therefore, care is required in the storage of wine flavored condiments and these are preferably stored in the freezer for maximizing durability. No adverse effects have been observed from such freezer storage. Of course, if the base solid is perishable, a solid condiment prepared from it should be stored under conditions known in the art to be appropriate for that base solid.

The solid condiments of the invention provide desirable color, flavor and/or aroma accents to foods of all types, such as meats, poultry, fish and other seafood, vegetables, fruits, dairy products such as cheese and yoghurt, breads, pastas, and desserts such as cakes, pies and ice cream. However, their use is not limited to non-liquid foods; they may also be added to liquid foods and drinks, e.g., juice, milk and milkshakes, to impart desirable color, flavor and/or aroma accents. For example, at least one solid condiment of the invention may be applied to a raw food or a prepared food, optionally in a decorative or multicolored pattern. The food may be eaten as a snack or as part of a meal. The food may be consumed in the home or away from home, for example, in a restaurant, cafeteria or fast food establishment. The solid condiment is envisioned for use as an ingredient used in preparing foods, may be added by the waitstaff at the restaurant table, may be placed on the table and added by the diner, or may be used by a chef or manufacturer to add, e.g., texture and flavor, to food.

The solid condiments of the invention may also provide desirable color, flavor and/or aroma accents to specialty foods, such as infant formula or baby food, medicines or pharmaceuticals, and animal food, such as pet food.

Unless otherwise noted, all percent and parts values given herein are by weight, i.e., weight percent (wt. %) and parts by weight.

These and other aspects of the present invention may be more fully understood with reference to the following non-limiting examples, which are merely illustrative of embodiments of the present invention, and are not to be construed as limiting the invention, the scope of which is defined by the appended claims.

EXAMPLES

Several sugar-based and salt-based condiments were prepared as described below. Their properties were evaluated as follows. The sugar-based condiments were placed in the mouth to evaluate their flavor. Tasted as is, the concentrated salt content of salt-based condiments often overpowers the other flavors present. Therefore, the flavor of salt based condiments was evaluated by placing a sample of the same on a relatively bland food, i.e., white bread with butter or oil or another food of the desired type. For example, cucumber was used as a "test" vegetable, veal and chicken were used for meats, and fish fillet and shrimp were used for seafood.

The aroma of the condiment was determined by placing a condiment sample weighing about 30 g in a screw-top lid glass or plastic container of about 175 mL volume, closing the lid, allowing the aroma to build in the air head space above the condiment for about 30 minutes at ambient temperature (about 23° C.), removing the lid, and sniffing the head space with the nose.

The mouth feel of sugar-based condiments was determined by chewing the product directly or applying it over whipped cream or ice cream and chewing.

The particle size range of the solid condiments was determined by particle size analysis methods well known to those in the art using U.S. standard sieves of known opening size. The particle size range of the starting base solids was determined by the same method.

The density range of the solid condiments and the base solids was determined by a method well known to those in the art, i.e., by measuring the volume of a particular weight of solid, then dividing the weight by the volume to obtain the density in grams/mL. Specifically, the solid of interest was poured through a funnel into a 50 or 100 mL graduated cylinder such that the top of the contained solid was level and the volume of the solid was measured. The solid was remove from the graduated cylinder and weighed. Then, the density was obtained by dividing the weight by the volume. For better accuracy, the procedure was repeated at least once so that an average density as obtained from the range of densities determined.

Example 1

Condiment From Red Wine and Salt

Wine, as poured from the bottle, was used. As described in the third method, the Burgundy red wine of Paul Masson was added to commercial Morton coarse kosher salt from a 3 lb box and having a particle size range from about 0.4 mm to about 2.0 mm. The wine was added at approximately half the volume of the salt until no liquid wine was present as a residue with the salt and until no white color remained. The condiment was dried for 1 hour at 140° F. with intermittent stirring. A free flowing, pink colored condiment that was dry to the touch and had a salty, wine flavor and/or aroma was obtained. As measured, the particle size range of this condiment was from about 0.4 mm to about 2.0 mm and its density range was from 1.0 to 1.15 g/mL.

Example 2

Condiment From White Wine and Salt

Wine, as poured from the bottle, was used. As described in the preceding example, the Nilerage Chardonnay 1999 white wine of George DuBoeuf was added to the commercial Morton coarse kosher salt of Example 1. The wine was added at approximately half the volume of the salt until no liquid wine was present as a residue with the salt and until no white color remained. The condiment was dried for 1 hour at 140° F. with intermittent stirring. A free flowing, white to pale yellow colored condiment that was dry to the touch and had a salty, wine flavor and/or aroma was obtained. As measured, the particle size range of this condiment was from about 0.4 mm to about 2.0 mm and its density range was from 1.02 to 1.15 g/mL.

Example 3

Condiment From Red Wine and Sugar

Wine, as poured from the bottle, was used. The Burgundy red wine of Example 1 was made into a paste with one quarter of the total amount used of commercial Domino granulated table sugar having a particle size range from about 0.1 mm to about 0.8 mm and a density averaging about 0.88 and ranging from about 0.85 to 0.94 g/mL. This paste was cut into the remaining sugar as described in the first method. A free flowing, pink colored condiment that was dry to the touch and had a sweet, wine flavor and/or aroma and a crunchy mouth feel was obtained. As measured, the particle size range of this condiment was from about 0.4 mm to about 6.4 mm and its density range was from 0.55 to 0.65 g/mL.

Example 4

Condiment From White Wine and Sugar

Wine, as poured from the bottle, was used. The Chardonnay white wine of Example 2 was made into a paste with one quarter of the total amount used of the granulated table sugar described in Example 3. This paste was cut into the remaining sugar as described in Example 3. A free flowing, white colored condiment that was dry to the touch and had a sweet, wine flavor and/or aroma and a crunchy mouth feel was obtained. As measured, the particle size range of this condiment was from about 0.4 mm to about 6.4 mm and its density range was from 0.55 to 0.65 g/mL.

Example 5

Condiment From Port Wine and Sugar

Wine, as poured from the bottle, was used. Robertson's Rebello Valete vintage 1983 port wine was made into a paste with one quarter of the total amount used of the granulated table sugar described in Example 3. This paste was cut into the remaining sugar as described in Example 3. A free flowing, light pink colored condiment that was dry to the touch and had a sweet, strong wine flavor and/or aroma and a crunchy mouth feel was obtained. As measured, the particle size range of this condiment was from about 0.4 mm to about 6.4 mm and its density range was from 0.55 to 0.65 g/mL.

Example 6

Condiment From Coffee and Sugar

Liquid espresso coffee was used for the preparation of coffee flavored sugar. The coffee was cooled slightly to room temperature (about 25° C.) before it was made into a paste with one quarter of the total amount used of the granulated table sugar described in Example 3. The paste was added to the remaining sugar as described in Example 3. This yielded an intensely flavored sugar product approximating the flavor and/or aroma of a "dry" cup of coffee. A free flowing, light brown colored condiment that was dry to the touch and had a sweet, coffee flavor and/or aroma and a crunchy mouth feel was obtained. As measured, the particle size range of this condiment was from about 0.4 mm to about 6.4 mm and its density range was from 0.55 to 0.65 g/mL.

Example 7

Concentrated Condiment From Coffee and Sugar

To form a concentrate with intense coffee flavor, the method as described in Example 6 was used and the process repeated, except that half way through the drying process, when the product was sufficiently dry, it was pressed through a sieve of the desired mesh size (U.S. #8, about 2.36 mm) and the sieved product was placed back into the oven to complete the drying. A free flowing, brown colored condiment that was dry to the touch and had a coffee flavor and/or aroma and a crunchy mouth feel was obtained. As measured, the particle size range of this condiment was from about 0.43 mm to about 2.2 mm and its density range was from 0.65 to 0.7 g/mL.

Example 8

Condiment From Chocolate and Sugar

To prepare chocolate sugar, Valrhona cocoa powder was liquefied by adding a small amount of water to the cocoa powder in a separate dish where the water droplets were stirred into the cocoa powder. After a few minutes, the cocoa powder was wetted by the water. Small aliquots of water were added to the cocoa powder in this fashion, thereby wetting it, until a liquid paste was formed. (Adding cocoa powder to water is not preferred because, given that cocoa powder is not soluble in water, the cocoa powder just floated on the surface of the water and did not become a slurry.) The liquified cocoa powder was then added to the granulated table sugar of Example 3 as described in Example 3. A free flowing, brown colored condiment that was dry to the touch and had a sweet, chocolate flavor and/or aroma and a crunchy mouth feel was obtained. As measured, the particle size range of this condiment was from about 0.4 mm to about 6.4 mm and its density range was from 0.55 to 0.65 g/mL.

Example 9

Condiment From Vanilla and Sugar

CVS Gold Label Premier liquid vanilla was made into a paste with one quarter of the total amount used of the granulated table sugar described in Example 3. This paste was cut into the remaining sugar as described in Example 3. A free flowing, amber colored condiment that was dry to the touch and had a sweet, vanilla flavor and/or aroma and a crunchy mouth feel was obtained. As measured, the particle size range of this condiment was from about 0.4 mm to about 6.4 mm and its density range was from 0.68 to 0.72 g/mL.

Example 10

Condiment From GALLIANO and Sugar

GALLIANO, a fruity flavored liqueur, was made into a paste with one quarter of the total amount used of the granulated table sugar described in Example 3. This paste was cut into the remaining sugar as described in Example 3. A free flowing, yellow colored condiment that was dry to the touch and had a sweet, fruity flavor and/or aroma and a crunchy mouth feel was obtained. As measured, the particle size range of this condiment was from about 0.4 mm to about 6.4 mm and its density range was from 0.55 to 0.65 g/mL.

Example 11

Condiment From ANISETTE and Sugar

ANISETTE, an anise flavored liqueur, was made into a paste with one quarter of the total amount used of the granulated table sugar described in Example 3. This paste was cut into the remaining sugar as described in Example 3. A free flowing, white colored condiment that was dry to the touch and had a sweet, anise flavor and/or aroma and a crunchy mouth feel was obtained. As measured, the particle size range of this condiment was from about 0.4 mm to about 6.4 mm and its density range was from 0.55 to 0.65 g/mL.

Example 12

Condiment From Mint and Salt

Spearmint spirits can be diluted with water to the desired concentration or taste, or used as is and added to the dry salt. A solution of spearmint in water was formed by adding 1 drop of highly concentrated spearmint (Herb Farm™ Liquid Spearmint Herbal Extract) to 100 mL of water. The resulting solution was added to the commercial Morton coarse kosher salt of Example 1 as described in Example 1. A free flowing, pale green jade colored condiment that was dry to the touch and had a salty, minty flavor and/or aroma was obtained. As measured, the particle size range of this condiment was from about 0.4 mm to about 2.0 mm and its density range was from 1.02 to 1.15 g/mL.

Example 13

Condiment From Mint, Salt and Food Coloring

A bright green colored condiment was obtained by incorporating 1 drop of McCormick green food coloring into the mint solution described in Example 12 before it was added to salt and then repeating the procedure described therein. A free flowing, bright green colored condiment that was dry to the touch and had a salty, minty flavor and/or aroma was obtained. As measured, the particle size range of this condiment was from about 0.4 mm to about 2.0 mm and its density range was from 1.02 to 1.15 g/mL.

Example 14

Condiment From Mint and Sugar

A solution of spearmint spirits in water was formed as described in Example 12. This solution was made into a paste with one quarter of the total amount used of commercial Domino granulated table sugar, the characteristics of which are given in Example 3. This paste was cut into the remaining sugar as described in Example 3. A free flowing, green colored condiment that was dry to the touch and had a sweet, mint, spice flavor and/or aroma and a crunchy mouth feel was obtained. As measured, the particle size range of this condiment was from about 0.4 mm to about 6.4 mm and its density range was from 0.55 to 0.65 g/mL.

Example 15

Condiment From Juniper Berries and Salt

About 2 grams of Whole Foods™ juniper berries were added to 100 mL of water and the extraction of their flavor was promoted by using a hand-held blender to cut the berries. The resulting product had the appearance of black pepper in yellow water. Solids were filtered from this product by using a folded paper coffee filter. The resulting scented and colored solution was added to the commercial Morton coarse kosher salt of Example 1 as described in Example 1. A free flowing, pale blue colored condiment that was dry to the touch and had a salty, spicy flavor and/or aroma was obtained. As measured, the particle size range of this condiment was from about 0.4 mm to about 2.0 mm and its density range was from 1.02 to 1.05 g/mL.

Example 16

Condiment From Juniper Berries, Salt and Food Coloring

A dark blue colored condiment was obtained by incorporating 1 drop of McCormick blue food coloring into the juniper berry solution described in Example 15 after filtering but before it was added to salt and then repeating the procedure described therein. A free flowing, dark blue colored condiment that was dry to the touch and had a salty, spicy flavor and/or aroma was obtained. As measured, the particle size range of this condiment was from about 0.4 mm to about 2.0 mm and its density range was from 1.02 to 1.05 g/mL.

Example 17

Condiment From Saffron and Salt

Saffron is a seasoning and a natural dye that provides a distinctive yellow color. Saffron powder or stemlet filaments can be extracted and/or diluted in a "solvent" of, e.g., water or white wine. The amount of solvent used will dictate the color of the solution. If a pale yellow is desired, more liquid is used to dilute the natural color of saffron.

A solution of saffron in water was formed by adding 1 filament of saffron (Whole Foods™ Roland Mancha Selecto brand) to 100 mL of water and stirring until dissolved. The resulting solution was added to the commercial Morton coarse kosher salt of Example 1 as described in Example 1. A free flowing, yellow colored condiment that was dry to the touch and had a salty, mild spicy flavor and/or aroma was obtained. As measured, the particle size range of this condiment was from about 0.4 mm to about 2.0 mm and its density range was from 1.02 to 1.05 g/mL.

Example 18

Condiment From PEPTO BISMOL and Sugar

PEPTO BISMOL® (Proctor & Gamble Co.) was made into a paste with one quarter of the total amount used of the granulated table sugar described in Example 3. This paste was cut into the remaining sugar as described in Example 3. A free flowing, pink colored condiment that was dry to the touch and had the flavor and/or aroma of PEPTO BISMOL and a crunchy mouth feel was obtained. As measured, the density range of this condiment was from 0.68 to 0.72 g/mL.

Example 19

Sugar-based Condiment Particle Size and Density

Several sugar-based solid condiments were prepared from a granulated sugar base solid by the first method, as described above, and their particle size distribution and density was experimentally determined. Table 3 summarizes the particle size distribution results. For comparative purposes, the measured particle size distribution of an extra fine sugar base solid is also included in this table.

TABLE 3

Sugar-Based Solid Condiment Average Particle Size and Density Analysis

| | Opening size<br>Sieve size | 6.30 mm<br>0.25 in | 2.36 mm<br>U.S. #8 | 1.00 mm<br>U.S. #18 | 0.425 mm<br>U.S. #40 | 0 mm<br>PAN | TOTAL | Avg. Density<br>g/mL |
|---|---|---|---|---|---|---|---|---|
| Product type | | | | | | | | |
| Blank 1 | (g) | 0 | 0 | 12 | 290 | 56 | 358 | 0.88 |
| Granulated Sugar | (%) | 0 | 0 | 3.4 | 81.0 | 15.6 | 100 | |
| Blank 2 | (g) | 0 | 0 | 0.0 | 468.0 | 108.0 | 576 | 0.92 |
| Extra Fine Sugar | (%) | 0 | 0 | 0 | 81.25 | 18.75 | 100 | |
| Midori Sugar | (g) | 30 | 54 | 12 | 6 | 0* | 102 | 0.49 |
| | (%) | 29.4 | 52.9 | 11.8 | 5.9 | 0.0 | 100 | |
| Beer Sugar | (g) | 32 | 38 | 10 | 0* | 0* | 80 | 0.52 |
| | (%) | 40 | 47.5 | 12.5 | 0* | 0* | 100 | |
| Tea Sugar | (g) | 46 | 42 | 12 | 0* | 0* | 100 | 0.58 |
| | (%) | 46 | 42 | 12 | 0* | 0* | 100 | |
| Blue Curacao | (g) | 0 | 14 | 14 | 0* | 0* | 28 | 0.60 |
| Sugar | (%) | 0 | 50 | 50 | 0* | 0* | 100 | |
| Vanilla Sugar | (g) | 0 | 28 | 84 | 44 | 8 | 164 | 0.70 |
| | (%) | 0 | 17.1 | 51.2 | 26.8 | 4.9 | 100 | |
| Lemon Sugar | (g) | 26 | 74 | 74 | 14 | 0* | 188 | 0.64 |
| | (%) | 13.8 | 39.4 | 39.4 | 7.4 | 0* | 100 | |
| Orange Sugar | (g) | 74 | 34 | 0 | 0* | 0* | 108 | 0.42 |
| | (%) | 68.5 | 31.5 | 0 | 0* | 0* | 100 | |
| Wine Sugar | (g) | 0 | 12 | 136 | 88 | 4 | 240 | 0.66 |
| Sample 1 | (%) | 0.0 | 5 | 56.7 | 36.7 | 1.7 | 100 | |
| Wine Sugar | (g) | 0 | 10 | 172 | 120 | 6 | 308 | 0.70 |
| Sample 2 | (%) | 0 | 3.2 | 55.8 | 3.90 | 1.9 | 100 | |

*0 = none or less than 0.1 for U.S. 40 and PAN

Table 3 illustrates the differences between the particle size distributions of the starting granulated table sugar base solid and the possible variations in the prepared solid condiment products. With the exception of the blue curacao and each of the wine sugar products, the other solid condiments in Table 3 were not prepared to achieve a specific particle size designation. Therefore, these products show a wide range of particle size and contain some very large aggregates. In contrast, the blue curacao and each of the wine sugar products were passed through a specific opening size prior to complete drying to create a desired, designed particle size. The ability to control product appearance in this fashion is evident with these three compositions.

For example, the granulated table sugar particle size distribution ranges under 1.00 mm as a maximum quantity, with the majority of product being retained on a US #40 screen of opening size 0.425 mm. This indicates that table sugar is primarily of particle size from 0.425–1.00 mm, with approximately 15% under 0.425 mm. The method of the invention significantly increases the amount of particles with a size above 1.00 mm and can reduce the portion of under 0.425 significantly. Thus, the method of the invention can increase the particle size of a sugar-based condiment product up to about six times its original state, from a particle size of under about 0.425 mm up to above about 6.3 mm. Additionally, the invention provides the ability to produce solid condiment products at any desirable particle size in between such extremes.

The particle size distribution of the solid condiments changed significantly from the starting base sugar. In particular, the starting base solid material, granulated sugar, has no appreciable component from above 1.00 mm to 6.30 mm. The sugar-based solid condiments of Example 18, however, comprise significant fractions, if not the majority, of their particle sizes in the range from above 1.00 mm to 6.30 mm. In this regard, it should be noted that there is no appreciable change in particle size distribution or density for salt-based solid condiments; their properties are similar to those of starting base solid material. Any minimal changes arise mainly from their handling during the process of forming a salt-based solid condiment.

Table 4 summarizes the particle size distribution results and provides density data.

TABLE 4

Summary of Typical Sugar Base and
Sugar-Based Solid Condiment Properties

| | Opening size | | | | | Avg.<br>Density |
|---|---|---|---|---|---|---|
| | 6.30 mm | 2.36 mm | 1.00 mm | 0.425 mm | 0 mm | |
| | Sieve size | | | | | |
| | 0.25 in | U.S. #8 | U.S. #18 | U.S. #40 | PAN | |
| Granulated Sugar | 0 | 0 | 3% | 81% | 16% | 0.88<br>g/mL |
| Extra Fine Sugar | 0 | 0 | 0 | 81% | 19% | 0.92<br>g/mL |

TABLE 4-continued

Summary of Typical Sugar Base and
Sugar-Based Solid Condiment Properties

| | Opening size | | | | | Avg. |
|---|---|---|---|---|---|---|
| | 6.30 mm | 2.36 mm | 1.00 mm | 0.425 mm | 0 mm | |
| | | | Sieve size | | | |
| | 0.25 in | U.S. #8 | U.S. #18 | U.S. #40 | PAN | Density |
| Sugar-Based Solid Condiment* | 22% | 32% | 32% | 13% | 1% | 0.6 g/mL |

*Averages of 6 sugar-based condiment samples in Table 3

The density of the solid condiments changed significantly from, i.e., is appreciably less than, the density of the starting base sugar. In particular, the starting base solid material, granulated sugar, has an average density of approximately 0.88 g/mL, determined from a range of densities from about 0.85 to about 0.94 g/mL. In contrast, each of the solid condiments has a density of approximately 0.6 g/mL. This density difference illustrates the influence on granulation of the present method, which creates a lighter aggregate granule. Additionally, the data of Table 3 demonstrate that a reduction in density of from about 20% to about 55% over the density of the sugar base solid has been achieved for the various sugar-based condiments therein.

For the sugar products, the reduction in density is an important factor. The method of the invention renders table sugar, commonly not pleasantly edible as is because of the gritty sensation when it is chewed and no other specific mouth feel as it immediately dissolves in saliva, into an edible crunchy solid condiment. Thus, the invention transforms sugar from an "invisible" ingredient withing a food concoction into a visible center of attention, e.g., in restaurant and gourmet dessert preparations.

It will be apparent to one skilled in the art that the present solid condiments provide many advantages not heretofore available. Only a few of these many advantages are mentioned below.

In particular, wine is rarely consumed with sugar products, a notable exception being Port wine with desserts. A wine sugar condiment product allows the taste of wine to be directly applied to a dessert product or to be used on fruit, such as grapefruit r strawberries, or other foods where wine is not usually consumed. Similarly, beer is not typically consumed directly with sugar or salt—beer salt and beer sugar allow this. Moreover, mint is usually associated with sweet products, however, a mint sugar condiment did not heretofore exist. When combined with salt to form a mint salt condiment, this provides a distinctively unique taste approach and new culinary options.

Furthermore, saffron is commonly used and often perceived as elegant by the diner. However, saffron is not typically associated with salt. Thus, serving saffron atop a steak, for example, would not be done. A saffron salt condiment of the invention, however, provides such a new use option. Juniper berries may be used during cooking of game meats to reduce the game odor, however, this spice is not used directly on meat after cooking. The juniper berry salt condiment prepared as described above provides new options for the enjoyment of game meats. Mint salt products do not exist, therefore, a mint flavored salt would be unique.

Although sugar is added to coffee or tea and both are enjoyed together, coffee and tea are usually enjoyed in liquid form. A coffee or tea sugar condiment provides the taste of a "dry" cup of coffee and may be a desirable snack product. In addition, such a condiment in the form of a topping allows for the addition of coffee flavor directly onto desserts of other confections. Chocolate comprises sugar, with the former as the primary component. A chocolate sugar condiment, however, provides a reversal of the primary component, thus providing an alternative to cocoa powder, which has limited solubility and usefulness in water based recipes. For example, cocoa powder floats on coffee, but a chocolate sugar condiment dissolves instantly in a cup of coffee.

Sweet ice cream toppings are typically limited to chocolate sprinkles and multicolored sprinkles. The new sugar-based products of the invention provide alternatives for this application, for instance, for the adult ice cream consumer, i.e., ice cream topped with wine, beer or sugar sprinkle crystals. Sweet liqueurs such as GALLIANO or mint are often used atop of fruit. A GALLIANO sugar condiment of the invention provides for previously unavailable solid dosing of this flavor with added visual appeal and a crunchy mouth feel.

A full exploration of the creative uses of these new products can best be done by tapping into the creativity of skilled chefs, who might prepare the following concoctions heretofore impossible to achieve. In creme brulee, its classical flavor can be varied widely by using the present sugar-based solid condiments in custard. For example, a coffee flavored, sugar-based solid condiment can be added to the custard to achieve a mocha flavor. As for creme anglaise, this basic vanilla sauce can be made into new and exciting variations with the above-described flavored sugar-based solid condiments. Whipped cream can be flavored with the sugar-based solid condiments of the invention instead of being serving plain, as these sugar-based condiment products provide options which are impossible to achieve for this tricky concoction with liquid flavorings. The dry solid condiments of the invention allow for the flavoring of any viscous food component, such as smooth cheeses, where liquid flavor addition would ruin the product. Furthermore, numerous foods and concoctions can be rolled in the present sugar-based solid condiments. These new products provide unlimited creative options with products such as candied fruits, chocolate and cake decorations.

While it is apparent that the invention herein disclosed is well calculated to fulfill the objects stated above, it will be appreciated that numerous modifications and embodiments may be devised by those skilled in the art. It is intended that the appended claims cover all such modifications and embodiments as fall within the true spirit and scope of the present invention.

I claim:

1. A method of forming a solid condiment comprising:

selecting a volume of at least one base solid, consisting of a first volume and a second volume;

selecting at least one dosing liquid;

adding the dosing liquid to the first volume of the base solid such that the first volume is substantially completely saturated and mixing to form a slurry;

spreading the second volume of the base solid into a layer with a maximum depth no greater than about 0,25 inch;

adding in at least one step the slurry to the layer and mixing the slurry with the layer to form a solid condiment such that substantially no dosing liquid flow is visible after the total volume of the base solid is present; and optionally, drying the solid condiment;

provided that when the base solid comprises sugar, the density of the solid condiment is from about 0.50 g/mL to about 0.70 g/mL and the solid condiment has a crunchy mouth feel.

2. The method of claim 1 which, when the base solid comprises sugar, further comprises mixing the solid condiment during drying.

3. The method of claim 1 which, when the base solid comprises sugar, further comprises sieving the solid condiment during drying.

* * * * *